Nov. 13, 1934.  L. D. BRADSHAW  1,980,375
BOMB RELEASING DEVICE
Filed July 17, 1933  2 Sheets-Sheet 2
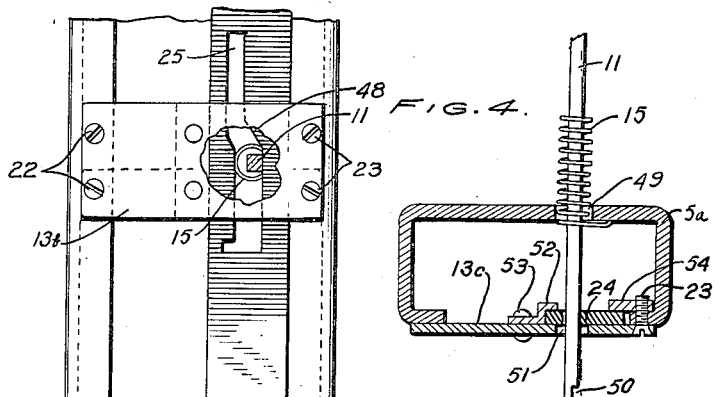
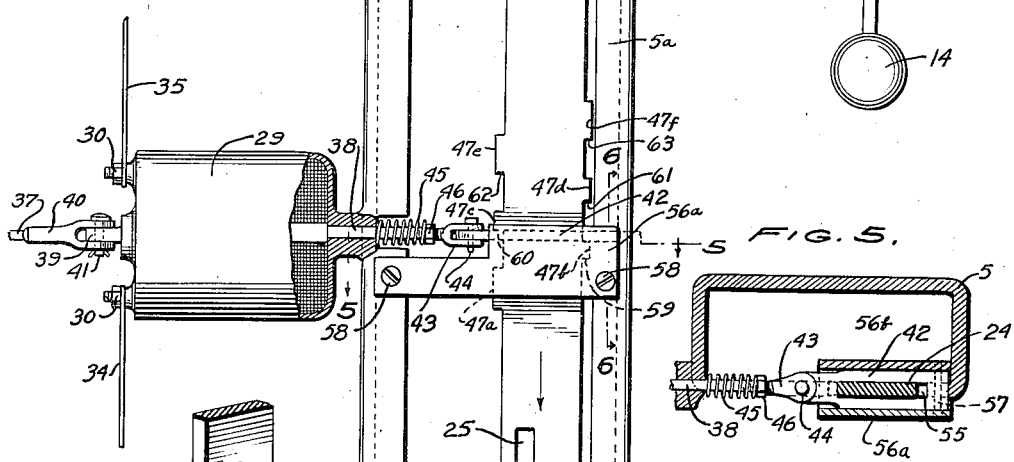
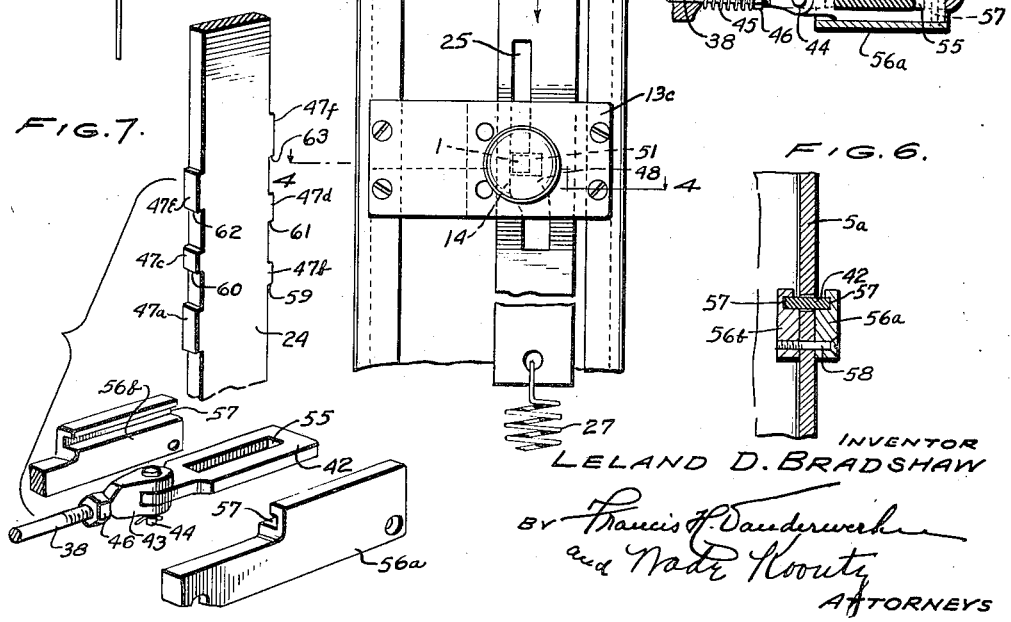
INVENTOR
LELAND D. BRADSHAW
BY
ATTORNEYS Patented Nov. 13, 1934

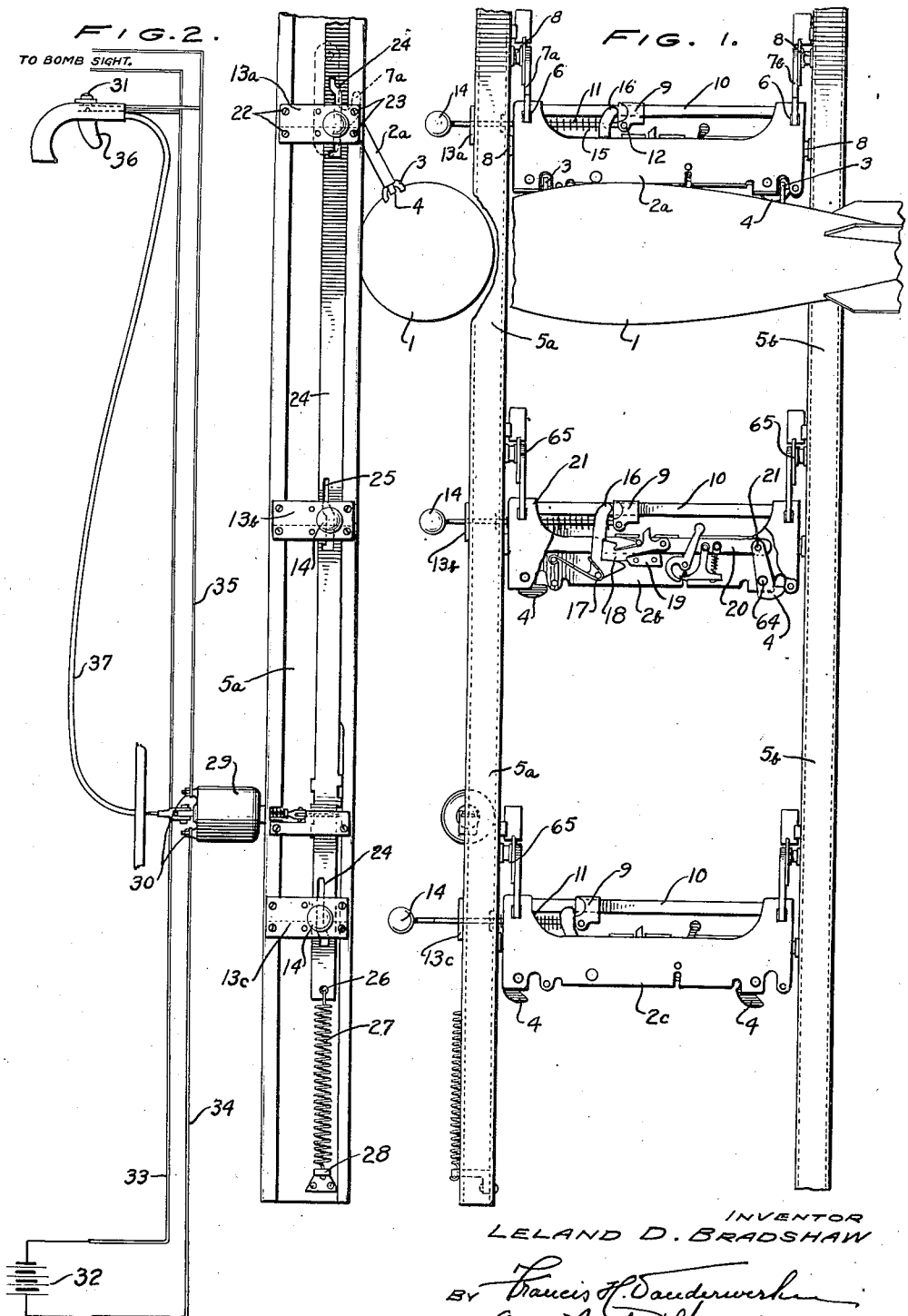

1,980,375

UNITED STATES PATENT OFFICE 1,980,375

BOMB RELEASING DEVICE

Leland D. Bradshaw, March Field, Calif.

Application July 17, 1933, Serial No. 680,824

11 Claims. (Cl. 244—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in releasing mechanism for aircraft bombs.

The principal object of the invention is to provide a mechanism which may be directly connected with a bomb sight for the automatic release of bombs, including means for manual or electrical emergency release of the same.

A further object of the invention is to reduce the time lag characteristic of bomb release mechanisms to a minimum through a major reduction of moving parts.

It is a still further object of the invention to provide for automatic release of a plurality of aircraft bombs, in predetermined sequence, without putting any burden of selection upon the bomber.

With the foregoing and other objects in view which will appear as the description proceeds, the invention consists of certain new and novel improvements in bomb release mechanisms which will be hereinafter more fully illustrated and described in the accompanying drawings and more particularly pointed out in the appended claims.

Referring to the drawings, in which numerals of like character designate similar parts throughout the several view:

Fig. 1 is a side view of a bomb rack and releasing mechanism.

Fig. 2 is an end view of the same.

Fig. 3 is an enlarged end view of a portion of a bomb rack hanger and bomb releasing mechanism.

Fig. 4 is a cross sectional view taken on the line 4—4 of Fig. 3.

Fig. 5 is a cross sectional view taken on the line 5—5 of Fig. 3.

Fig. 6 is a cross sectional view taken on the line 6—6 of Fig. 3.

Fig. 7 is an exploded view in perspective of the draw-bar, tripping mechanism and supporting bracket.

Referring to the upper portion of Fig. 1, a bomb 1 is secured to a shackle 2a by means of a ring 3 and a bomb hook 4. The shackle 2a is pivotally secured to hangers 5a and 5b by means of apertures 6 and hooks 7a and 7b. The hooks 7a and 7b are in turn fixedly secured to the hangers 5a and 5b by means of spacers 8. A slide 9 is mounted upon a guide 10 fixed at its outer extremities to the hooks 7a and 7b. A rod 11 is secured at its inner extremity to the slide 9 by means of a pin 12. The rod 11 passes through an aperture provided in the hook 7a, through a second aperture provided in the hanger 5a, and is guided at its outer extremity by an aperture provided in a plate 13a. The rod 11 is telescoped within a tension spring 15, which is fixedly secured at one extremity to the slide 9 and at its other extremity to the aforementioned aperture provided in the hanger 5a. The manner in which a handle 14 is restained from movement with reference to the outermost surface of the plate 13a will be discussed under Fig. 4.

The mid portion of Fig. 1 shows a second shackle 2b freely supported from the hooks 7a and 7b. Part of the outer housing of the shackle 2b has been cut away to show the operating parts thereof. The upper portion of a trigger 16 is shown in engagement with the slide 9. As the slide 9 moves to the left, the trigger 16 pivots at its lower extremity about a pin 17, disengaging a latch 18 from a sear 19. Through the foregoing actuation of parts, a link 20, pivotally attached at its outermost extremities to the bomb hooks 4 by means of the pins 21, is permitted to move to the right. Upon maximum right hand movement of the link 20, the bomb hooks 4, the slide 9, and rod 11 assume the positions shown at the lower portion of Fig. 1.

The top portion of Fig. 2 shows an end view of the attachment of the bomb 1 to the hanger 5a by means of the shackle 2a and the hook 7a. A plurality of plates 13a, 13b and 13c are secured to the hanger 5a by means of screws 22 and 23. These plates act as guides for a draw-bar 24. The draw-bar 24 is provided with apertures 25 and a hole 26, to which latter hole is secured a tension spring 27. The lower extremity of the tension spring 27 is secured to the hanger 5a by means of a bracket 28. A solenoid 29 is also fixedly secured to the hanger 5a. Electrical terminals 30, of the solenoid 29, are operatively connected with a switch 31 and a battery 32 by means of electric cables 33, 34 and 35. The solenoid 29 is further operatively connected with a trigger 36 by means of a Bowden wire 37. The electric cables 33 and 35 are also operatively connected with a bomb sight (not shown), for automatic release of the bombs.

Fig. 3 shows an enlarged end view of the hanger 5a immediately above and below the solenoid 29. The solenoid 29 is provided with an inwardly extending rod 38 and an outwardly extending lug 39. A Bowden wire 37 is connected to the lug 39 by means of the clevis 40 and clevis pin 41. A tripping slide 42 is secured to the rod 38 by means of a clevis 43 and clevis pin 44. The clevis 43 is forced away from the side of the hanger 5a by means of the compression spring 45 and adjustable nut 46. The draw-bar 24 is provided with tripping slide stops 47a through 47f. It will be noted that the tripping slide stops 47a through 47f have been arranged in staggered relationship so that none of the stops lie diametrically opposite to one another.

At the top of Fig. 3, a portion of the plate 13b has been cut away to show the position of the rod 11, with reference to the sides of the aperture 25. It will be noted that any appreciable downward movement of the draw-bar 24 will cause the rod 11 to move to the left, due to the presence of the cammed projection 48. Such a repositioning of the rod 11 is shown at the bottom of Fig. 3.

Fig. 4 shows the rod 7 and handle 14 in a position corresponding to the showing of the same parts at the bottom of Fig. 1. The tension spring 15, extended through and secured to the hole 49 in the hanger 5a, has caused the handle 14 to move outwardly a maximum distance away from the plate 13c. It will be noted that the rod 11 is provided with a notch 50. The notch 50 is adapted to be engaged with and locked to the right hand portion of an aperture 51 provided in the plate 13c. Referring to the bottom portion of Fig. 3, it will be seen that the cammed projection 48, of the aperture 25, has released the notch 50 from engagement with the right hand portion of the aperture 51. The draw-bar 24 is held in sliding engagement with the plate 13c by means of the bracket 52, fixedly secured to the plate 13c by means of the rivets 53 and the bracket 54 fixedly attached to the hanger 5a by means of the screws 23.

Fig. 5 shows in detail the manner of securing the tripping slide 42 to the hanger 5a, as well as the manner in which the tripping slide 42 secures the draw-bar 24 against vertical movement. An opening 55 is provided in the tripping slide 42. In length, this opening is slightly in excess of the combined widths of the draw-bar 24 and any one of the tripping slide stops 47a through 47f. The position of the tripping slide 42 being identical to that shown in Fig. 3, in which the left hand portion of the opening 55 is securely held against the left hand edge of the draw-bar 24, downward movement of the draw-bar 24, induced by the tension spring 27, is prevented by engagement of the under portion of the tripping slide stops 47c with the upper left hand portion of the tripping slide 42. The tripping slide 42 is held against vertical movement with reference to the hanger 5a by means of brackets 56a and 56b, which are provided with guide grooves 57.

Fig. 6 shows the manner of attaching the brackets 56a and 56b to the hanger 5a by means of screws 58.

Fig. 7 is an exploded view, in perspective, of the draw-bar 24, tripping slide 42 and brackets 56a and 56b.

The operation of the invention is as follows:

Referring to Fig. 2, it is first essential that the draw-bar 24 be brought to its maximum upward position. This may be readily accomplished by exerting sufficient upward manual pressure to overcome the downward impulse of the tension spring 27 and at the same time making possible upward movement of the draw-bar 24 by alternate engagement and release of the solenoid 29. With the draw-bar 24 in maximum upward position, it is possible to push all of the rods 11 inwardly, by means of the handles 14, until the notches 49 are engaged with the right hand portions of the apertures 51 provided in the plates 13. Through the foregoing operation, all the slides 9 are positioned as shown in the upper and central portions of Fig. 1. It is thus possible to hang any desired multiple of the shackles 2 upon the hook 7, in a downwardly extending position without the slide 9 interfering with the trigger 16 of the shackle 2.

By means of a bomb hoist (not shown), the bomb 1 is raised to a position approximately that shown in the upper portions of Figs. 1 and 2. The bottom portion of the shackle 2a is swung outwardly and the hook 4 inserted within and secured to the ring 3 of the bomb 1, by movement of the link 20 from extreme right hand to extreme left hand position. The operating parts of the shackle 2a are then positioned as shown in the central portion of Fig. 1 with the shackle 2 swung outwardly as shown in Fig. 2. The foregoing operation is repeated until all of the bombs 1 have been secured to the hangers 5a and 5b.

Referring to Fig. 3, it will be noted that the draw-bar 24 is provided at a point opposite to the solenoid 29 with tripping slide stops 47a through 47f. Through alternate disengagement of the under portions 59, 60, 61, 62 and 63 of the aforementioned tripping slide stops from the right and left extremities of the opening 55 provided in the tripping slide 42, it is possible to bring about five successive downward movements of the draw-bar 24. As shown in Fig. 3, the tripping slide 42 has been disengaged from the under portion 59, whereupon the draw-bar 24 has moved downward until the under portion 60 has contacted with the left extremity of the opening 55 provided in the tripping slide 42. The foregoing operations release the lowermost bomb 1 secured to the hanger 5, permitting the bomb shackle 2 to swing downward into the position shown in Fig. 1. During the aforementioned draw-bar movement, the cam surface 48 moved downwardly, pushing the rod 11 to the left as shown in Fig. 4, thus disengaging the notch 50 from the right hand extremity of the aperture 51 provided in the plate 13. With the aforementioned disengagement, the rod 11 is drawn outwardly by the tension spring 15 into the position shown in Fig. 4. Each succeeding actuation of the solenoid 29 causes outward movement of a succeeding rod 11 until all of the bombs 1 attached to the hangers 5a and 5b have been released.

Referring to the mid-portion of Fig. 1, it will be seen that outward movement of the rod 11 will cause the slide 9 to move to the left, upon the guide 10, with corresponding movement of the upper portion of the trigger 16 to the left. Counter-clockwise rotation of the trigger 16 about the pin 17 releases the latch 18 from the sear 19, permitting the link 20 to move to the extreme right. The latter movement causes clockwise rotation of the hooks 4 about the pins 64, permitting release of any rings 3 which may be secured thereby. To assure that the shackle 2a is not accidentally disengaged from the hooks 7, the locking means 65 is provided at the upper extremities of the hooks 7. The aforementioned locking means may be readily disengaged when it is desired to remove the bomb shackle 2a from the hooks 7.

I claim:

1. In a bomb releasing apparatus, a rack, a bomb shackle carried by said rack and including a trigger, manually releasable spring-operated means carried by said rack for actuating said trigger, said means including a plate carried by said rack, and a rod passing through an aperture in said plate and being slidably supported thereby, said rod being provided with a notch adapted to releasably engage said plate and secure said rod against longitudinal movement, and power means operatively connected with said first-mentioned means for releasing the same and thereby actuating said trigger.

2. In a bomb releasing apparatus, a rack, a bomb shackle carried by said rack and including a trigger, manually releasable spring-operated means carried by said rack for actuating said trigger, said means including a plate carried by said rack, and a rod passing through an aperture in said plate and being slidably supported thereby, said rod being provided with a notch adapted to releasably engage said plate and with a handle for effecting disengagement of said notch from said plate for releasing said rod to longitudinal movement, and power means operatively connected with said first-mentioned means for releasing the same and thereby actuating said trigger.

3. In a bomb releasing apparatus, a rack, a bomb shackle carried by said rack and including a trigger, manually releasable spring-operated means carried by said rack for actuating said trigger, said means including a plate carried by said rack, and a rod passing through an aperture in said plate and being slidably supported thereby, said rod being provided with a notch adapted to releasably engage said plate, with a tension spring secured at one extremity to said rod and at the other extremity to said plate and with a handle for effecting disengagement of said notch from said plate for automatically releasing said rod to longitudinal movement, and power means operatively connected with said first-mentioned means for releasing the same and thereby actuating said trigger.

4. In a bomb release apparatus as set forth in claim 3 further means cooperating with said trigger for independently releasing said bomb, said second-mentioned means being characterized by including a vertically disposed, power-actuated draw-bar having a cammed surface adapted to engage an end portion of said rod to release the same from locked position for actuating said trigger, and means carried by said rack for releasing said power-actuated draw-bar.

5. In a bomb release apparatus as set forth in claim 3, further means cooperating with said trigger for independently releasing said bomb, said second-mentioned means being characterized by having a draw-bar vertically disposed and provided with a cammed surface adapted to engage an end portion of said rod and to release the same from locked position upon movement of the draw-bar, said bar having a tripping slide stop upon a side thereof and means for slidably engaging said stop for automatically releasing said power-actuated draw-bar.

6. In a bomb releasing apparatus, a rack, a bomb shackle carried by said rack, said shackle including a trigger, and means cooperating with said trigger for releasing said bomb, said means including a power-actuated draw-bar operatively connected therewith and means operatively connected with said draw-bar for releasing the same, said means including a tripping release, an electric circuit comprising a solenoid and a switch for operating the same, said solenoid having its armature connected to said tripping release and a manual means for actuating said armature.

7. In a bomb releasing apparatus, a rack, horizontally disposed bomb shackles carried by said rack, each of said shackles including a trigger, a like number of manually releasable spring operated means carried by said rack for separately actuating said trigger, including a like number of horizontally disposed slidable rods, a power-actuated draw-bar having a like number of cammed surfaces adapted to successively engage the end portions of said slidable rods to release the same from locked position for successively actuating said triggers and having a like number of tripping slide stops upon the sides thereof, and means for successively engaging and disengaging oppositely disposed stops for successively releasing said power-actuated draw-bar.

8. In a bomb releasing apparatus, a rack, horizontally disposed bomb shackles carried by said rack, each of said shackles including a trigger, a like number of manually releasable spring operated means carried by said rack for separately actuating said trigger, including a like number of horizontally disposed slidable rods, a vertically disposed power-actuated draw-bar being so constructed and arranged such that successive downward movements of said draw-bar effect upwardly progressing releases of a line number of said horizontally disposed slidable rods.

9. In a bomb releasing apparatus, a rack, a bomb shackle carried by said rack, said shackle including a trigger, and means cooperating with said trigger for releasing said bomb, said means including a power-actuated draw-bar operatively connected therewith, and electrically operated means for successively engaging and disengaging stops disposed on opposite sides of said draw-bar.

10. In a bomb releasing apparatus, a rack, a bomb shackle carried by said rack, said shackle including a trigger, and means cooperating with said trigger for releasing said bomb, said means including a power-actuated draw-bar operatively connected therewith, and electrically operated means operatively connected with said draw-bar for successively engaging and disengaging oppositely disposed stops, said electrical means including a solenoid carried by said bomb rack and remotely operable manual means for moving the armature of said solenoid.

11. In a bomb releasing apparatus, a rack, a bomb shackle carried by said rack, said shackle including a trigger, and means cooperating with said trigger for releasing said bomb, said means including a power-actuated draw-bar operatively connected therewith, and electrically operated means operatively connected with said draw-bar for successively engaging and disengaging oppositely disposed stops, said electrical means including a solenoid carried by said bomb rack and operating against a spring, and manually operated means connected to the armature of said solenoid for actuating said armature independent of said electrical means.

LELAND D. BRADSHAW.